(12) United States Patent
Atsuumi

(10) Patent No.: US 6,510,912 B1
(45) Date of Patent: Jan. 28, 2003

(54) STEERING AND LUBRICATION SYSTEM COMPONENT ARRANGEMENT FOR LAND VEHICLES

(75) Inventor: Mamoru Atsuumi, Shizuoka (JP)

(73) Assignee: Yamaha Hatsudoki Kabushiki Kaisha (JP)

(*) Notice: Subject to any disclaimer, the term of this patent is extended or adjusted under 35 U.S.C. 154(b) by 0 days.

(21) Appl. No.: 09/721,133

(22) Filed: Nov. 22, 2000

(51) Int. Cl.$^7$ .................................................. B62D 1/16
(52) U.S. Cl. ...................... 180/69.1; 180/400; 180/182
(58) Field of Search ................................ 180/400, 182, 180/186, 190, 291, 69.1; 280/771, 779, 93.502

(56) References Cited

U.S. PATENT DOCUMENTS

| | | | |
|---|---|---|---|
| 2,492,923 A | * 12/1949 | Moore et al. ............... | 192/3.57 |
| 4,915,070 A | 4/1990 | Okui | |
| 5,024,287 A | 6/1991 | Okui et al. | |
| 5,129,476 A | * 7/1992 | Kikuchi et al. ............. | 180/234 |
| 5,195,607 A | * 3/1993 | Shimada et al. ............ | 180/296 |
| 5,240,088 A | 8/1993 | Okui et al. | |
| 5,531,291 A | * 7/1996 | Sato et al. .................. | 180/297 |
| 5,558,549 A | 9/1996 | Nakase et al. | |
| 5,839,930 A | 11/1998 | Nanami et al. | |
| 5,951,343 A | 9/1999 | Nanami et al. | |
| 6,015,320 A | 1/2000 | Nanami | |

FOREIGN PATENT DOCUMENTS

| | | | | |
|---|---|---|---|---|
| JP | 2124360 A | * | 5/1990 | ............ B62D/1/16 |
| JP | 2001193559 A | * | 7/2001 | ............ F02F/7/00 |

* cited by examiner

*Primary Examiner*—Kevin Hurley
(74) *Attorney, Agent, or Firm*—Knobbe, Martens, Olson & Bear LLP

(57) ABSTRACT

A land vehicle includes an improved construction that can space a steering linkage from the terrain even though an engine for the vehicle has an oil pan positioned at a lower portion of the engine and the steering linkage passes below the engine. The land vehicle includes a drive unit that depends from a body frame and abuts the terrain. The body frame carries the engine. The oil pan is positioned generally at a bottom of the engine and lubricant oil temporarily accumulates in the oil pan. A steering assembly is connected to the body frame for steering movement. The steering assembly includes a pair of skis and a steering linkage extending through the body frame and arranged to steer the skis. The steering linkage and the oil pan, at least in part, are generally horizontally juxtaposed with each other.

28 Claims, 7 Drawing Sheets

STEERING AND LUBRICATION SYSTEM COMPONENT ARRANGEMENT FOR LAND VEHICLES

RELATED APPLICATIONS

This application is based upon Japanese Patent Application No. HEI 11-184,469, filed Jun. 29, 1999, which is hereby expressly incorporated by reference in its entirety.

BACKGROUND OF THE INVENTION

1. Field of the Invention

The present invention generally relates to steering and lubrication systems for land vehicles. More particularly, the present invention relates to positioning various components of such system in land vehicles, such as a snowmobiles, to accommodate both systems while maintaining adequate ground clearance.

2. Description of Related Art

Snowmobiles are popular land vehicles that are used primarily in the winter and in cold and snowy conditions. Because of the terrain on which they operate, snowmobiles often contact hidden obstacles, such as rock and logs, that are buried in the snow. Snowmobiles, therefore, often are soundly designed with an eye on reducing damage to the snowmobile caused by encounters with such obstacles.

A typical snowmobile includes a frame assembly, an endless drive belt and a slide rail assembly that supports the drive on a side opposite the side that engages the terrain for propelling the snowmobile along the terrain. The frame assembly carries an engine which powers the drive belt through a suitable transmission and drive mechanism. Two steering skis depend from the frame assembly for steering the snowmobile. A steering handle extends to the rider's area from the frame assembly so that the rider can operate it. A steering linkage couples the steering skis and the steering handle.

Snowmobile designers have recently been implementing four stroke engines in order to reduce emissions during engine operation. Typically, however, the size of the engine body of a four cycle engine is greater than the size of the engine body of a two cycle engine. One of the reasons is that the four cycle engine has a lubrication system which is much different from that of the two cycle engine. Particularly, a bottom end portion of the engine generally defines an enlarged oil pan in which lubricant oil accumulates. Thus, the overall vertical height of the engine is increased by the oil pan.

The steering linkage between the operator controls and the steering skis generally must extend beyond the engine. Typically, the linkage will pass into an area where the oil pan of a four-cycle engine is positioned. Thus, to accommodate the steering linkage, either the engine has to be raised or the linkage must be lowered. Raising the engine disadvantageously raises the center of gravity of the snowmobile; however, if the linkage is lowered to a position adequately below the engine, the steering linkage portion is much more likely to contact the terrain during operation of the snowmobile. Such contact can damage the steering system.

A need therefore exists for an improved land vehicle that can keep a steering linkage portion spaced apart from the terrain with a sufficient distance even though an engine for the vehicle has an oil pan placed generally at a bottom thereof.

SUMMARY OF THE INVENTION

One aspect of the present invention involves a snowmobile comprising a frame assembly. A drive assembly depends from the frame assembly and is adapted to abut on the terrain so as to propel the snowmobile along the terrain. An internal combustion engine is carried by the frame assembly so as to power the drive assembly. The engine includes an oil pan in which lubricant oil accumulates. The oil pan is positioned generally at a bottom end of the engine. A steering ski depends from the frame assembly for steering movement. A steering linkage extends through the frame assembly and is arranged to steer the ski. The steering linkage and the oil pan, at least in part, are generally horizontally juxtaposed with each other.

Another aspect of the present invention comprises a land vehicle comprising a body frame. A drive unit depends from the body frame and is adapted to abut on the terrain so as to propel the vehicle along the terrain. An internal combustion engine is carried by the body frame so as to power the drive unit. The engine includes an oil pan in which lubricant oil accumulates. The oil pan is positioned generally at a bottom of the engine. A steering assembly depends from the body frame for steering movement. The steering assembly includes an abutting member adapted to abut on the terrain. A steering linkage extends through the body frame and is arranged to steer the steering member. The steering linkage and the oil pan, at least in part, are generally horizontally juxtaposed with each other.

Another aspect of the present invention involves a vehicle comprising a frame assembly with at least one steerable member supporting the frame and contacting a surface over which the vehicle operates. A control mast is positioned rearward of the at least one steerable member with a linkage extending between the control mast and the at least one steerable member. The linkage comprises a rotating link and a translating link with the rotating link extending between the control mast and the translating link. An internal combustion engine is mounted to the frame assembly and is positioned between the at least one steerable member and the control mast. The engine comprises an oil pan having a lower surface and the translating link extends from the rotating link forward to a location forward of the oil pan along a portion of the oil pan at a position above the lower surface.

A further aspect of the present invention involves a vehicle comprising a frame assembly and at least one steerable member supporting the frame and contacting a surface over which the vehicle operates. A control mast is positioned rearward of the at least one steerable member with a linkage extending between the control mast and the at least one steerable member. The linkage comprises a rotating link and a translating link with the rotating link extending between the control mast and the translating link. An internal combustion engine is mounted to the frame assembly and is positioned between the at least one steerable member and the control mast. The engine comprises an oil pan having a lower surface and an auxiliary chamber. The auxiliary chamber is defined by a cover and is positioned to a side of the engine. A longitudinally extending recess is formed in a lower portion of the engine between at least a portion of the oil pan and at least a portion of the cover with the translating link extending in a longitudinal direction within the recess.

Further aspects, features and advantages of this invention will become apparent from the detailed description of the preferred embodiment which follows.

BRIEF DESCRIPTION OF THE DRAWINGS

These and other features, aspects and advantages of the present invention will now be described with reference to the drawings of a preferred embodiment, which is intended to illustrate and not to limit the invention. The drawings comprise seven figures.

DETAILED DESCRIPTION OF THE PREFERRED EMBODIMENT OF THE INVENTION

Figure 1:
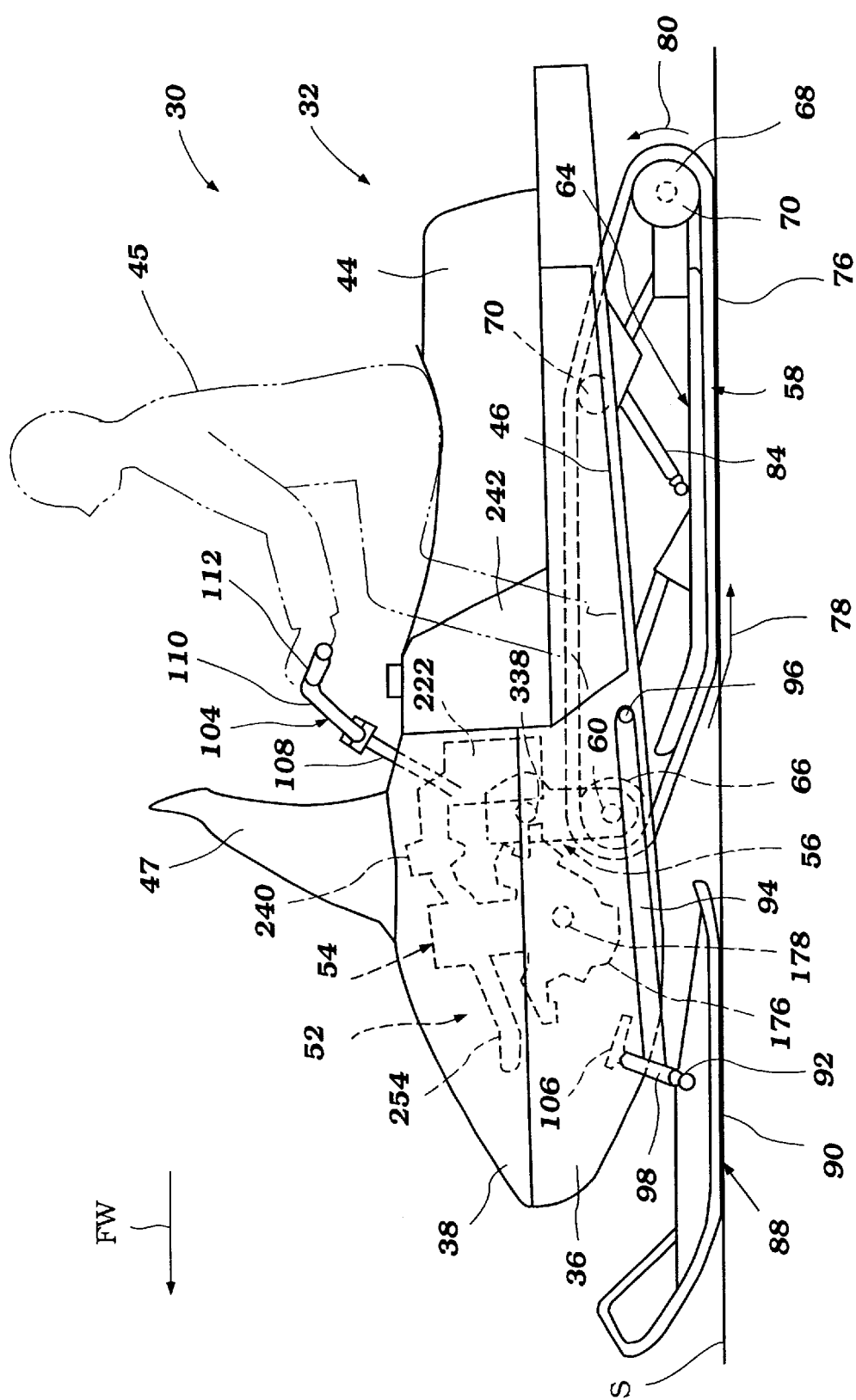
FIG. 1 is a simplified side elevation view of a snowmobile configured and arranged in accordance with certain features, aspects and advantages of the present invention. Certain internal components have been illustrated with hidden lines.
Figure 2:
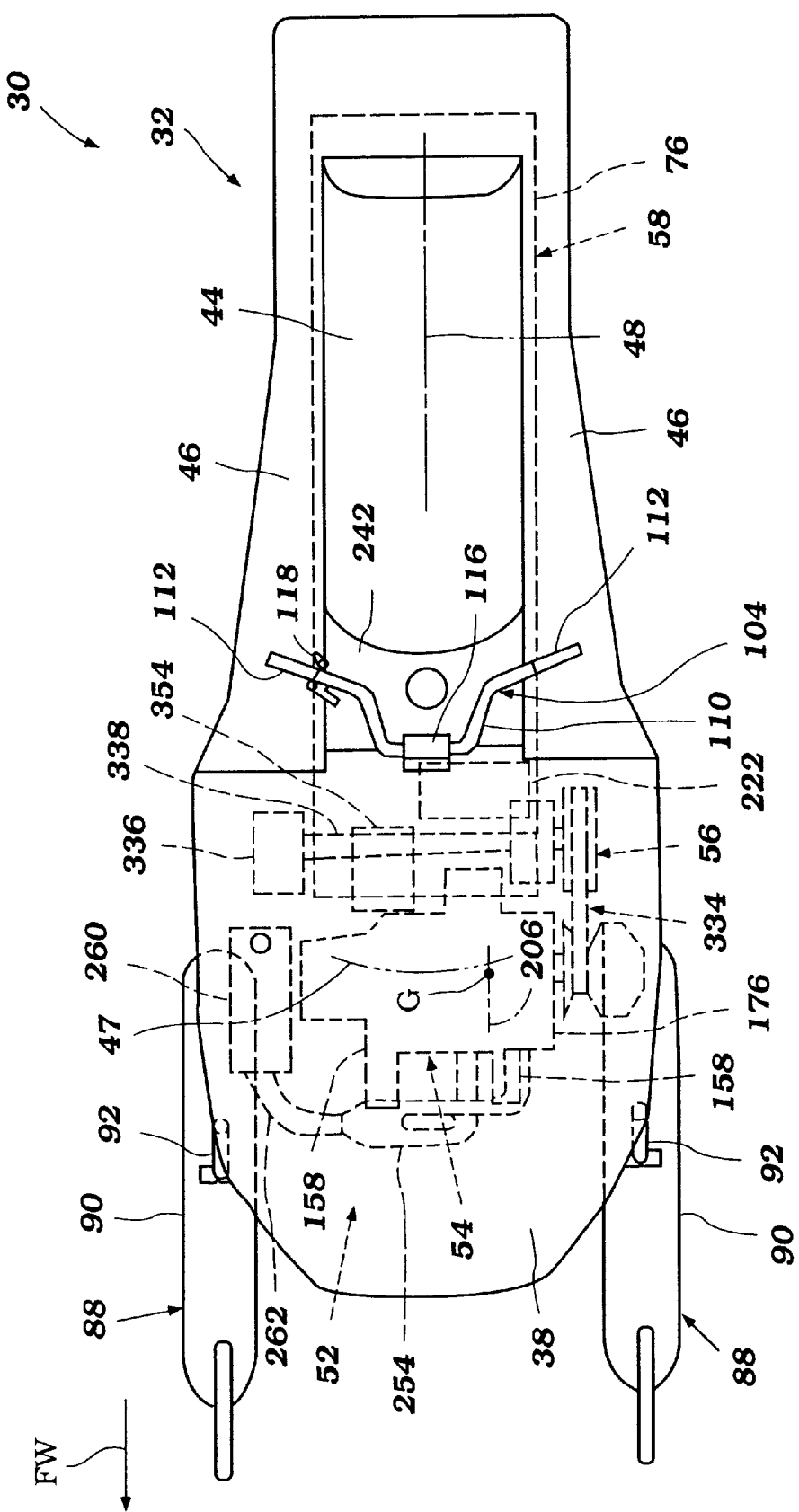
FIG. 2 is a top plan view of the snowmobile of FIG. 1.
Figure 3:
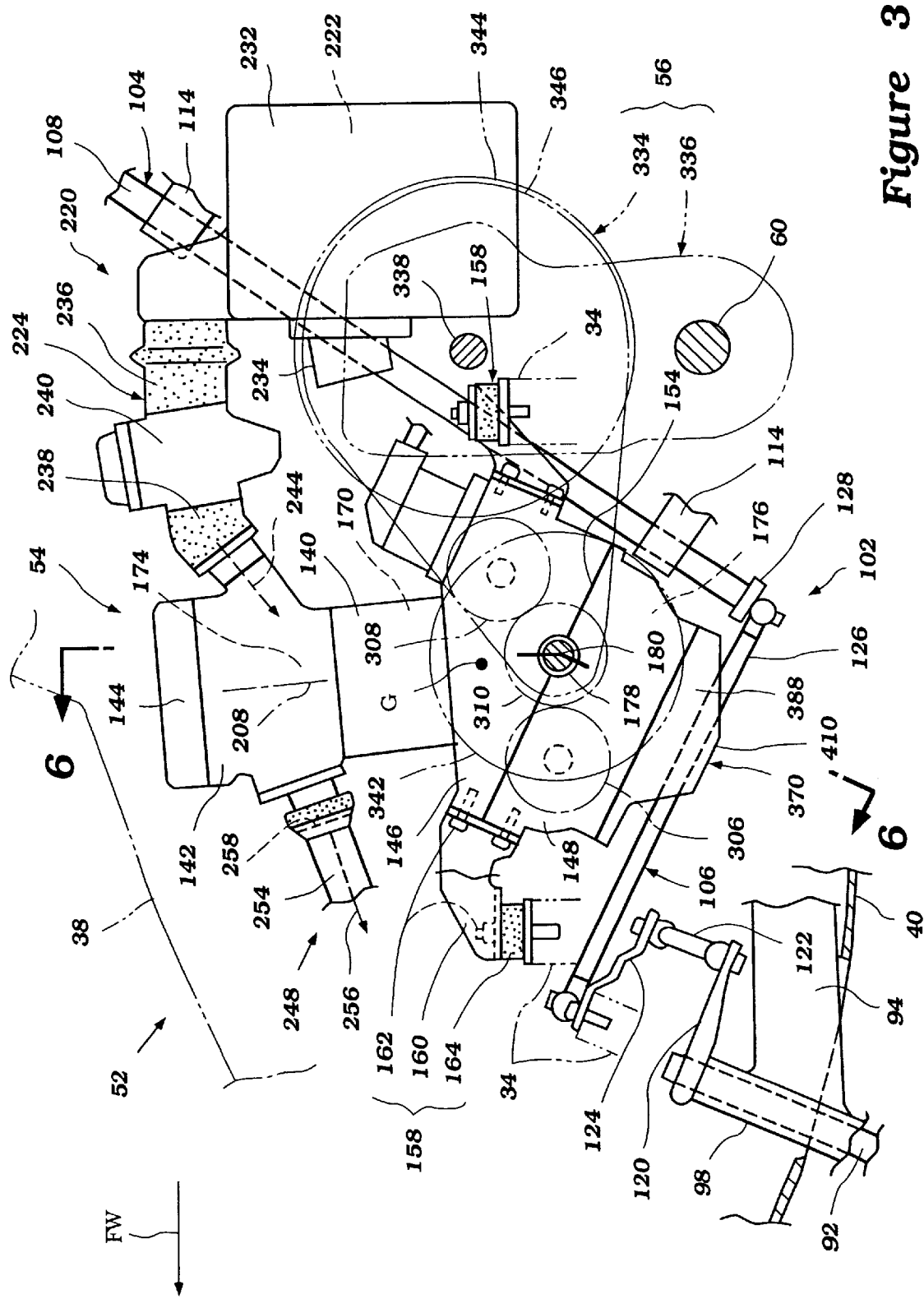
FIG. 3 is an enlarged side elevation view, primarily showing an engine and a steering linkage.

With reference initially to FIGS. 1–3, an overall construction of a land vehicle is illustrated therein. In the illustrated arrangement, the land vehicle comprises a snowmobile 30 configured and arranged in accordance with certain features, aspects and advantages of the present invention. The snowmobile 30 is an exemplary land vehicle. Although the present invention will be shown and described in the context of the illustrated snowmobile, some aspects and features of the present invention also can be employed with other land vehicles in manners that will become apparent.

In general, the snowmobile 30 operates over a snowfield or terrain, indicated generally with the reference letter S in FIG. 1, which typically is covered with snow. The reference mark FW in the figures indicates a forward direction in which the snowmobile 30 generally moves. As used through this description, the terms "right" and "left" will mean at or to the respective sides in a top plan view relative to the forward direction FW.

The illustrated snowmobile 30 generally comprises a frame assembly 32, which can include a plurality of frame members 34 (see FIG. 3). The frame members 34 can be formed with sheet metal, metal pipes or the like and preferably are assembled in any suitable manner to have sufficient rigidity. Two side panels 36 generally cover the sides of the frame assembly 32 in the illustrated arrangement. In addition, a cowling member or hood 38 covers a forward portion of the frame assembly 32. Preferably, the cowling member 38 is detachably coupled with the frame assembly 32 or pivotally hinged thereto at one end so as to pivot about the hinged portion. The side panels 36 and the cowling member 38 can be made of plastic or synthetic resin. A bottom plate 40 (see FIG. 3), which can be made of sheet metal, advantageously covers a bottom portion of the frame assembly 32. Thus, a substantially closed compartment is formed over a forward portion of the frame assembly 32 by the side panels 36, the cowling member 38 and the bottom plate 40.

A seat 44 can be disposed above a rear portion of the frame assembly 32 so that the rider 45. In some arrangements, the seat 44 can be positioned such that a rider 45 can place her feet in front of the seat 44. In the illustrated arrangement, the seat 44 is disposed such that the rider 45 straddles the seat with a foot positioned on each side of the seat 44. Thus, in the illustrated arrangement, a pair of foot rests 46 are disposed on both sides of the seat 44. A windshield 47 extends upwardly from the cowling member 38 to protect the rider 45 from wind and/or snow impinging upon him or her.

With reference to FIG. 2, the frame assembly 32, when provided with the side panels 36, the cowling member 38, the seat 44 and the wind shield 46, generally is substantially symmetrically formed relative to an imaginary center plane 48 extending generally vertically and fore to aft through the frame assembly 32. Due to the arrangement of the various body components, such as the seat 44, the cowling 38, and the side panels 36, for instance, the frame assembly 32 is substantially enclosed.

The side panels 36 and the bottom plate 40 placed in front of the seat 44 together with the cowling member 38 define a generally closed cavity, as discussed above. A prime mover assembly 52 can be enclosed within the cavity. Because the cowling member 38 is detachably coupled with or pivotally hinged to the frame assembly 32, the rider 45, a mechanic or a repairman can access the prime mover assembly 52 for maintenance or the like. The illustrated prime mover assembly 52 generally comprises an internal combustion engine 54 and a transmission 56 which transmits power from the engine 54 to a drive assembly or unit 58 through a driveshaft 60. In other words, the transmission converts the engine output to speed and torque. In the illustrated arrangement, the driveshaft 60 is journaled on the frame assembly 32.

With reference again to FIG. 1, the drive assembly 58 depends from the frame assembly 32 and is generally disposed beneath the seat 44. The drive assembly 58, although somewhat schematically shown in FIG. 1, preferably includes a slide rail unit 64, a drive sprocket 66, a set of idle shafts 68 and a corresponding set of idle sprockets 70. The slide rail unit 64 comprises a pair of slide rails which extend fore and aft along the center plane 48. Preferably, the slide rails are spaced apart from one another. The respective idle shafts 68 extend generally transversely and are journaled on the illustrated slide rail unit 64. The idle sprockets 70 preferably are suitably secured to the respective idle shafts 68.

The slide rail unit 64 together with the drive sprocket 66 and the idle sprockets 70 support an endless drive belt 76. More specifically, the slide rail unit 64 abuts a backside of the drive belt 76, which is opposite the side of the drive belt 76 facing the terrain S, and the drive sprocket 66 engages with the drive belt 76 to provide rotational movement to the drive belt 76. The respective idle sprockets 70 contact the drive belt 76 in known manners. With reference to FIG. 2, the drive belt 76 has a relatively broad width and a longitudinal center line of the drive belt 76 is placed generally on the center plane 48. When the drive sprocket 66 rotates, the drive belt 76 also rotates in a direction indicated with the arrows 78, 80. Because the drive belt 76 has a sufficient contact area with the terrain S, the drive belt 76 produces a friction or traction force and the rotation of the drive belt 76 propels the snowmobile along the terrain S.

The drive assembly 58 preferably is provided with at least one suspension unit 84. The suspension units 84 suspend the slide rail units 64 and damp movement of the suspension unit 84 relative to the frame assembly 32. The damping movement of the suspension units 84 properly absorbs shocks coming from rough surfaces of the terrain S and hence the rider 45 can enjoy a comfortable ride.

In the illustrated arrangement, the snowmobile 30 also includes a pair of steering skis 88. Each ski 88 preferably comprises a ski member 90 and a knuckle pin 92. The ski member 90 includes a contact area, which typically abuts on the terrain S during movement of the snowmobile 30. The knuckle pin 92 is coupled with the ski member 90 at a generally top center portion of the ski member 90 and allows the ski to pivot fore and aft such that the ski member 90 can follow rough surfaces of the terrain S.

With reference to FIG. 1, a pair of support members 94 supports the respective steering skis 88 at both sides of the frame assembly 32. Each support member 94 preferably has one end 96 secured to the frame assembly 32. A sleeve 98 is formed at the other end of the support member 94. The sleeve 98 extends generally vertically and inclines slightly rearward. Preferably, the sleeve 98 is welded at a mid portion thereof to the support member 94. The sleeve 98 pivotally supports the rod member 94 about a steering axis that extends generally vertically. Through this mounting arrangement, the ski members 90 can be steered, i.e., their forward portions are selectively directed in the right or left direction.

In order to steer the skies 88, the snowmobile 30 includes a steering linkage 102 that is arranged and configured in accordance with certain features, aspects and advantages of the present invention. With reference now to FIGS. 2–5, the steering linkage 102 comprises a steering handle assembly 104 and a linkage assembly 106.

The illustrated steering handle assembly 104 comprises a handle post 108, a handle bar 110 and a pair of grips 112. The handle post 108 extends generally vertically but its top portion inclines slightly rearward. The frame assembly 32 supports the handle post 108 with support members 114 (see FIG. 3) in a manner that provides for pivotal movement of the handle post 108 about a steering axis. The handle bar 110 is positioned atop the handle post 108 and is coupled thereto by a coupling member 116 or in any other suitable manner. The grips 112 can be secured to both ends of the handle bar 110. Preferably, a throttle lever 118 is provided on the right hand side of the handle bar 110. In the illustrated arrangement, the handle post 108 defines a first linkage member in the linkage assembly 106.

The linkage assembly 106 couples the steering handle assembly 104 with the steering skies 88 such that the pivotal movement of the steering handle assembly 102 about the steering axis moves the steering skies 88 in the right or left direction. The linkage assembly 106 in the illustrated arrangement includes two knuckle arms 120 (see FIG. 3), two tie rods 122 (see FIG. 4), a center arm 124, a relay rod 126 and a pitman arm 128. Of course, other components also can be incorporated and some components can be integrated into a single component.

In the illustrated arrangement, the knuckle arms 120 are mounted to the respective knuckle pins 92. The tie rods 122 then couple the knuckle arms 120 with the center arm 124 which can pivot about a pivot axis 130 extending generally vertically as indicated by the arrows 132 of FIG. 4. Of course, as shown in FIG. 3, generally vertically should be construed to encompass a slight incline to accommodate the angles formed by the rotational axes running through the various components.

The forward end of the relay rod 126 in the illustrated arrangement is pivotally connected to a portion of the center arm 124. The connection between the relay rod 126 and the center arm 124 preferably is off set from the pivot axis 130 so that the center arm 124 pivots about the pivot axis 130 when the relay rod 126 is pushed or pulled. The other end, i.e., the rear end, of the relay rod 126 is pivotally connected to one end of the pitman arm 128. The pitman arm 128 preferably is affixed to a lower portion of the handle post 106. In the illustrated arrangement, the relay rod 126 inclines such that the forward end of the relay rod 126 is positioned higher than the rear end. Such a configuration advantageously increases the area for the forward linkage to be positioned for operation by increasing the ground clearance at that location. In other words, the simpler connection is mounted lower than the more complicated connection (i.e., that having more moving components). In the illustrated arrangement, the relay rod 126 defines a second linkage member.

Because of this arrangement, when the rider 45 turns the handle post 108 with the handle bar 110, the pitman arm 128 pivots about an axis of the handle post 108. With this movement of the pitman arm 128, the relay rod 126 is pushed or pulled in an axial direction as indicated by the arrows 134 of FIG. 4. The center arm 124 thus pivots about the pivot axis 130 and moves the respective tie rods 122 right or left as indicated by the arrows 136. Both of the tie rods 122 then move in the corresponding right or left direction. For example, if the tie rod 122 on the right hand moves in the right direction, the other tie rod 122 moves also in the right direction, and vice versa. The knuckle arms 120 then pivot the respective knuckle pins 92. Accordingly, the respective steering skies 88 pivot in the right direction or left direction in compliance with the pivotal direction of the center arm 124.

With reference now to FIGS. 3–7, the prime mover assembly 52 is disposed within the substantially closed protective cavity defined by the side panels 36, the bottom plate 40 and the cowling member 38. The engine 54 is placed generally forward of the transmission 56 within this cavity.

In the illustrated arrangement, the engine 54 operates on a four-cycle principle and includes an cylinder block 140, a cylinder head member 142, a cylinder head cover member 144, an upper crankcase member 146 and a lower crankcase member 148. It is anticipated that some features, aspects and advantages of the present could be used with a two-stroke or rotary engine; however, the configuration of a four cycle engine particularly benefits from most features, aspects and advantages of the present invention.

In the illustrated arrangement, the upper crankcase member 146 is placed under the cylinder block 140 and the lower crankcase member 148 is placed under the upper crankcase member 146. Both the crankcase members 146, 148 are joined together at a coupling line 154 which is generally defined by a lower surface of the upper crankcase member 146 and an upper surface of the lower crankcase member 148. In the illustrated arrangement, the coupling line 154 is inclined downward and rearward. In addition, the coupling line generally extends through at least a portion of the crankshaft and, more preferably, is aligned with a rotational axis of the crankshaft.

Figure 4:
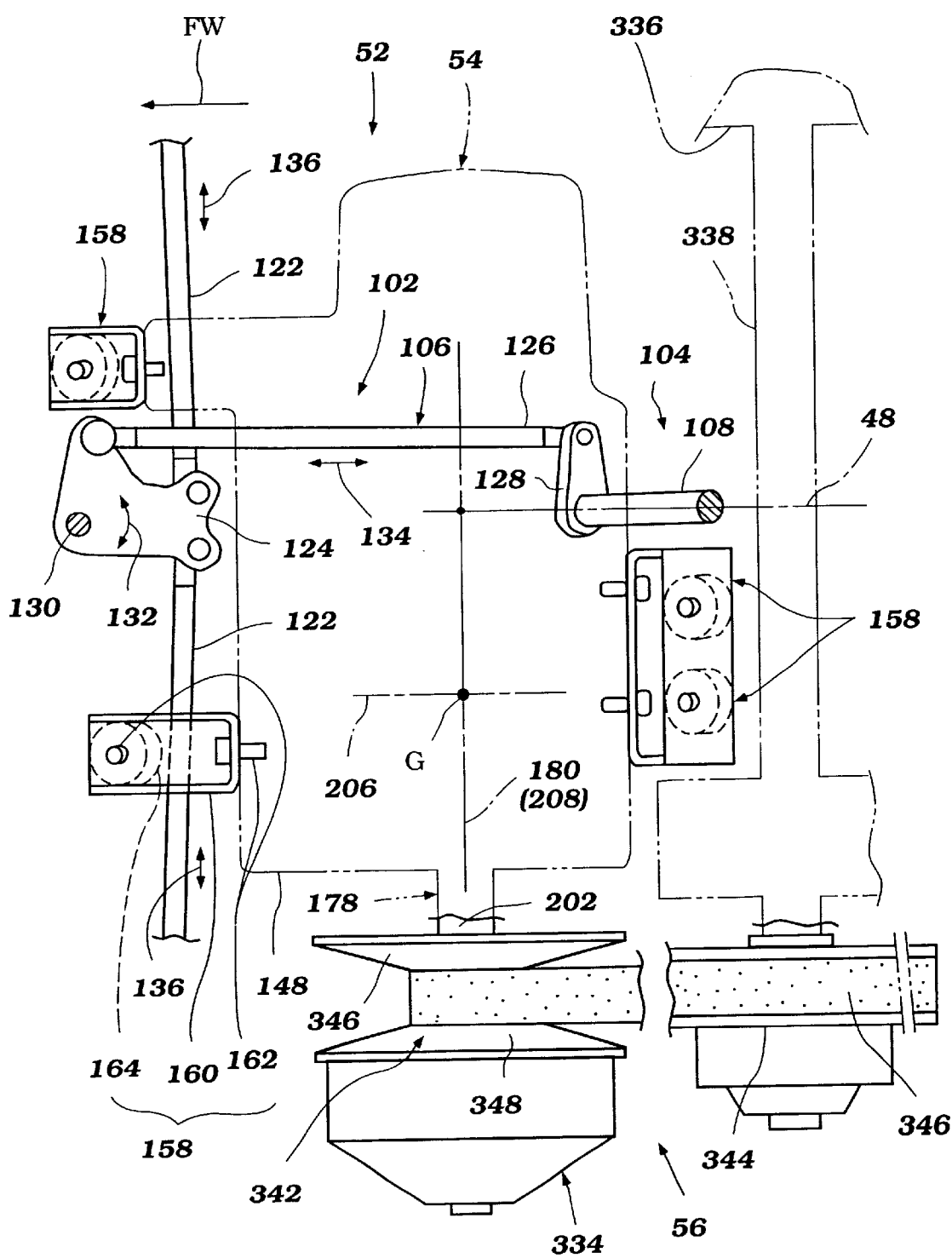
FIG. 4 is an enlarged top plan view, primarily showing the engine and the steering linkage.

With reference now to FIGS. 3 and 4, the upper crankcase member 146 is mounted to the frame members 34 alone or in combination with the lower crankcase member 148 by a plurality of mount assemblies 158. The illustrated mounting arrangement allows the engine 54 to be securely mounted to the frame assembly 32. Each mount assembly 158 preferably includes a bracket or stay 160, bolts 162 and an elastic member 164. The brackets 160 can be attached to the crankcase members 146, 148 directly by the bolts 162 and are can be affixed to the frame assembly 32 indirectly via the elastic members 164 by the bolts 162. The elastic members 164 preferably are made of a rubber material to isolate vibration energy from the frame. Advantageously, because the engine 54 is mounted on the frame assembly 32 in this manner, most of the low grade vibrations produced by the engine 54 are not transferred to the frame assembly 32. Although not shown, the transmission 56 preferably is coupled with the engine 54 and also can be mounted to the frame assembly 32 directly or indirectly via the engine 54. In other words, in some arrangements, the transmission 56 and the engine 54 are mounted to the frame assembly 32 as a single unit.

Figure 6:
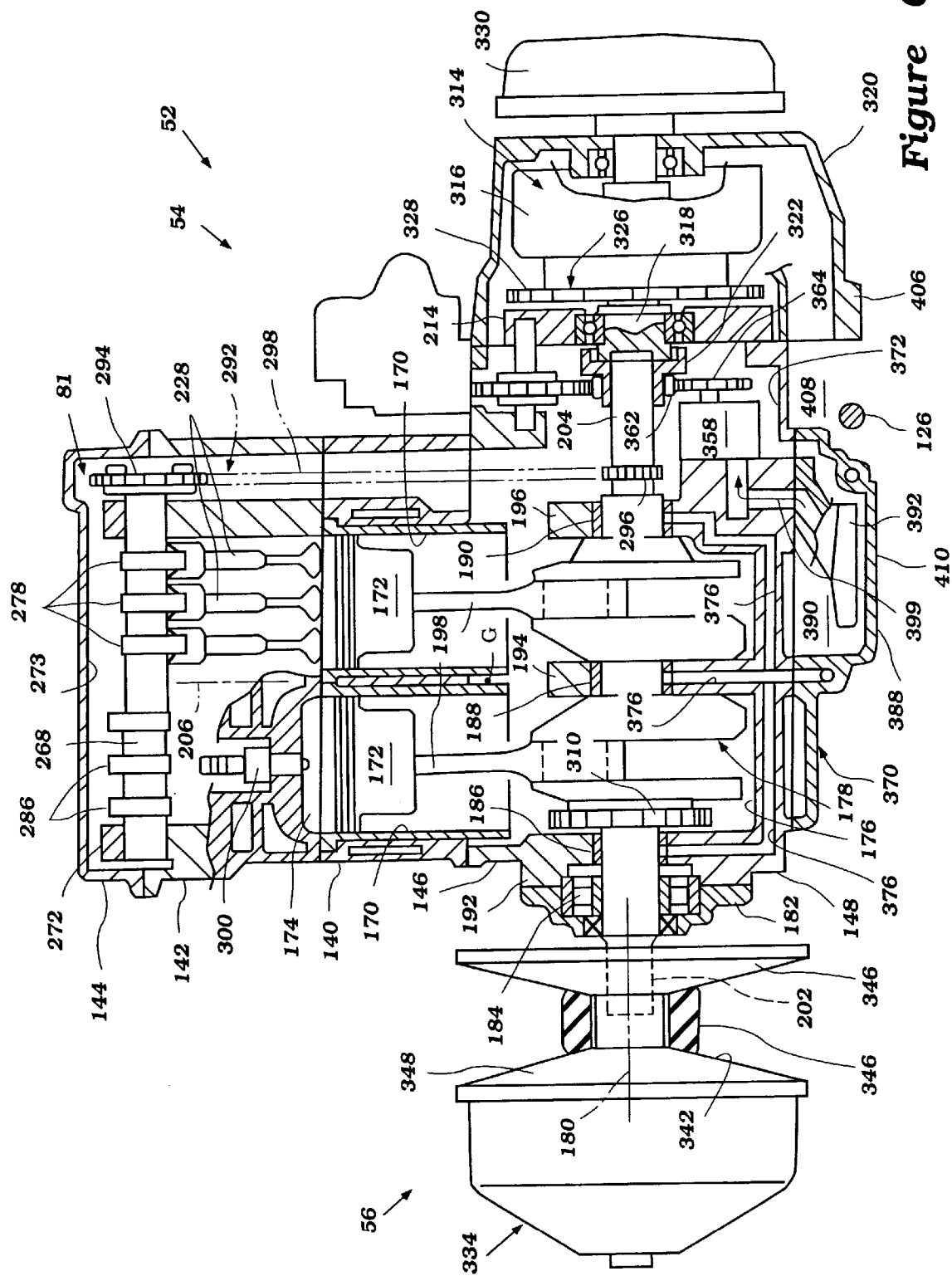
FIG. 6 is a cross-sectional view taken along the line 6—6 of FIG. 3.

With reference now to FIG. 6, the illustrated cylinder block 140 defines two cylinder bores 170. The cylinder bores 170 extend generally vertically and are horizontally spaced from each other so as to stand side by side. This type of engine, however, is only exemplary. Engines having other number of cylinder bores, having other cylinder arrangements and operating on other combustion principles (e.g., two-stroke crankcase combustion or rotary) all can be used with certain features, aspects and advantages of the present invention.

A piston 172 can reciprocate in each cylinder bore 170. The cylinder head member 142 is affixed to the top end of the cylinder block 140 and, together with the pistons 172 and the cylinder bores 170, defines two combustion chambers 174.

The upper and lower crankcase members 146, 148 preferably close the lower end of the cylinder block 140. The crankcase members 146, 148 together define a crankcase chamber 176. A crankshaft 178 extends generally horizontally within the crankcase chamber 176 so that an axis 180 of the crankshaft 178 extends generally normal to the center plane 48. In other words, the engine preferably is transversely mounted. The coupling line 154 crosses the axis 180 (see FIG. 5). A crankcase cover member 182 preferably covers a left end of the coupled upper and lower crankcase members 146, 148 and substantially encases a set of bearings 184 and a seal.

The crankshaft 178 is journaled by the crankcase members 146, 148 and the cover member 182. In the illustrated arrangement, a plurality of bearings 184, 186, 188, 190, which are positioned at the cover member 182 and a left side portion 192, a middle portion 194 and a right side portion 196 of the crankcase members 146, 148, respectively, support the crankshaft 178. The crankshaft 178 is connected to the pistons 172 by connecting rods 198 and is rotated by the reciprocal movement of the pistons 172. In the illustrated arrangement, the crankshaft 178 is configured so that both the pistons 172 move 360 degrees out of phase relative to one another. That is, for example, when one of the pistons 172 is in the power stroke, the other piston 172 is in the intake stroke.

A left side end 202 of the crankshaft 178 extends beyond the cover member 182, while the right side end 204 of the crankshaft 178 extends beyond the right side portion 196. In the illustrated embodiment, an imaginary vertical plane 206 extends through a center of the middle portion 194 generally parallel to the center plane 48. Another imaginary vertical plane 208 which includes the crankshaft axis 180 crosses the vertical plane 206. The center of gravity G of the engine 54 preferably exists generally in the line where both the vertical planes 206, 208 cross each other and in generally a top area of the crankcase chamber 176, as shown in FIGS. 3–6.

With reference to FIG. 6, in the illustrated arrangement, although the left side portion 192 actually defines an end wall of the crankcase chamber 176, the right side portion 194 does not define the other wall end of the crankcase chamber 176 and the chamber 196 expands further beyond the right side portion 194. A bearing member 214, which will be described shortly, substantially defines the right side end wall of the crankcase chamber 176. A portion of the crankshaft 178 between the middle portion 194 and the right side portion 196 is positioned almost at the center of the crankcase chamber 176 along the crankshaft axis 180.

Figure 7:
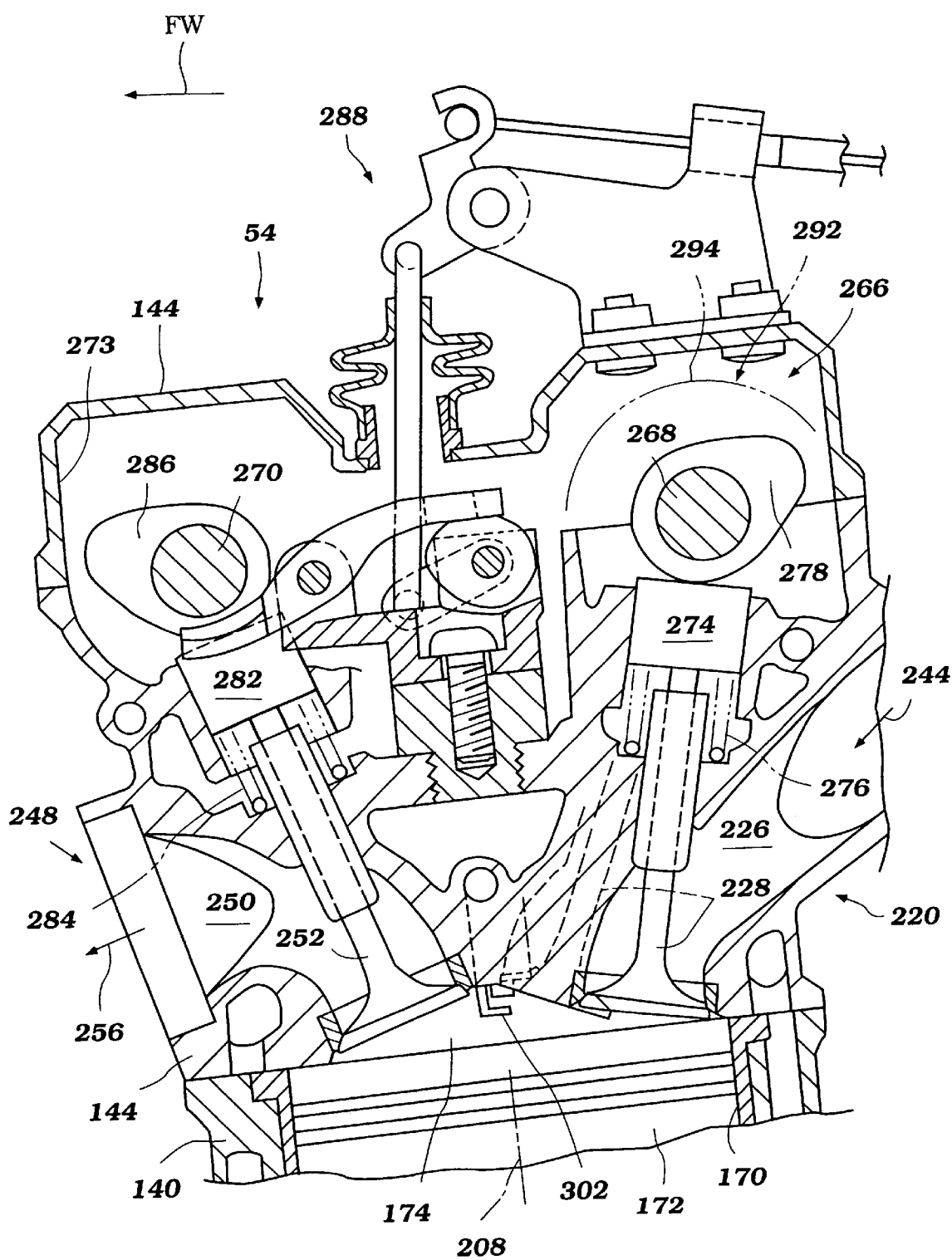
FIG. 7 is a cross-sectional view showing a combustion chamber, intake and exhaust ports, intake and exhaust valves and a valve drive mechanism of the engine.

With reference again to FIG. 3, the engine 54 includes an air induction system 220 through which air is introduced into the combustion chambers 174. The induction system 220 preferably includes a plenum chamber 222, two air intake passages 224 and six intake ports 226 (FIG. 7). As will be recognized, the number of intake passages and ports can vary.

The intake ports 226 are defined in the cylinder head member 144. In the illustrated arrangement, three of the intake ports 226 are associated with a single intake passage 224 and these intake ports 226 open into a single combustion chamber 174. The intake ports 226 are repeatedly opened and closed by intake valves 228. When the intake ports 226 are opened, the respective intake passages 224 communicate with the associated combustion chambers 174.

The plenum chamber 222 generally functions as an intake silencer and/or a coordinator of air charges. The plenum chamber 222 preferably also functions as an air cleaner and contains a cleaner element that removes foreign substances (i.e., dirt and dust) from the air. In the illustrated arrangement, a plenum chamber member 232 defines the plenum chamber 222 and is mounted to the frame assembly 32 in a conventional manner. The plenum chamber member 232 preferably has an air inlet opening 234 that opens forwardly in the closed cavity. The illustrated intake passages 224 extend forwardly from the plenum chamber member 232. Each intake passage 224 is defined by an upstream intake duct 236, a downstream intake duct 238 and a carburetor 240 interposed between both the intake ducts 236, 238. The respective ducts 236, 238 preferably are made of elastic material such as rubber.

The carburetor 240 includes a throttle valve and a fuel measurement mechanism that measures an amount of fuel supplied to the associated combustion chamber 174 in proportion to an amount of air measured by the throttle valve. The throttle valve is coupled with the throttle lever 118 on the handle bar 110 by an appropriate control cable so that the rider 45 can operate it. The fuel is introduced into the carburetor 240 from a fuel supply tank 242 (FIG. 1), which preferably is disposed between the cowling member 38 and the seat 44, through a proper fuel supply conduit.

The air in the cavity is introduced into the plenum chamber 222 through the air inlet opening 234 and then is introduced into the combustion chambers 174 through the respective intake passages 224 and the intake ports 226, as indicated by the arrow 244 of FIGS. 3 and 7. On the way to the combustion chambers 174, the fuel is mixed with the air in the carburetors 240 to form air/fuel charges that can be burned in the combustion chambers 174. The engine 30, of course, can include a fuel injection system (either direct or indirect) instead of, or in addition to, the carburetors 240, which are shown as one type of charge formers that can be employed.

The engine 54 also includes an exhaust system 248 that discharges burnt air/fuel charges or exhaust gases from the combustion chambers 174. Two exhaust ports 250 are defined in the illustrated cylinder head member 144 for each combustion chamber 174 and are repeatedly opened and closed by a corresponding set of exhaust valves 252. When the exhaust ports 250 are opened, the combustion chambers 174 communicate with an exhaust manifold 254 (FIGS. 2 and 3) which collects the exhaust gases and directs them away from the combustion chambers 174, as indicated by the arrow 256 of FIGS. 3 and 7. Preferably, the exhaust manifold 254 is connected to the exhaust ports 250 by intermediate tubular members 258 made of an elastic material, such as rubber. The exhaust manifold 254 is coupled with an exhaust silencer 260 through an exhaust conduit 262. The exhaust gases move to the silencer 260 from the exhaust manifold 254. The silencer 260 reduces exhaust noise to a level below than a predetermined level and then discharges the exhaust gases to the atmosphere, i.e., out of the cavity, through an appropriate exhaust pipe. The exhaust system can be tuned in any suitable manner.

The engine 54 preferably has a valve drive mechanism 266 that comprises an intake camshaft 268 and an exhaust camshaft 270. The camshafts 268, 270 extend generally parallel to one another and are journaled on the cylinder head member 144, which has an appropriate bearing construction. Camshaft caps 272 (see FIG. 6), which also have a suitable bearing construction, fix the camshaft 268, 270 onto the cylinder head member 144. The cylinder head cover member 144 defines a camshaft chamber 273 together with the cylinder head member 144.

Each illustrated intake valve 228 comprises an intake valve tappet 274. A bias spring 276 preferably urges each tappet 274 in a direction that closes the valve 228. The intake camshaft 268 has cam lobes 278 that can push the respective intake valve tappets 274 downwardly with the rotation of the intake camshaft 268 against the urging force of the bias springs 276. The intake camshaft 268 thus actuates the intake valves 228 with the cam lobes 278 that push the tappets 274. Accordingly, the associated intake ports 226 are opened and closed repeatedly by rotation of the camshaft 268.

Like the intake valves 228, each illustrated exhaust valve 252 comprises an exhaust valve tappet 282. A bias spring 284 urges each tappet 282 such that the valve 252 is closed. The exhaust camshaft 270 also has cam lobes 286 that can push the respective exhaust valve tappets 282 downwardly against the urging force of the bias springs 284 with the rotation of the exhaust camshaft 270. The exhaust camshaft 270 thus actuates the exhaust valves 252 with the rotation of the camshaft 270. Accordingly, the associated exhaust ports 250 are opened and closed repeatedly by rotation of the camshaft 270.

In the illustrated arrangement, the valve drive mechanism 266 further includes a decompression mechanism 288. This mechanism 288 advantageously assists manual starting of the engine 54 (i.e., use of a recoil starter) by holding the exhaust valves 252 in the open position before the engine 54 starts. By holding the exhaust valves in an open position, the compression within the cylinder can be greatly reduced during the compression stroke of the piston. After the engine 54 starts, the mechanism 288 immediately releases the valves 252 for normal operation.

With reference again to FIG. 6, the crankshaft 178 drives the camshafts 268, 270 through a suitable cam drive mechanism 292. Each camshaft 268, 270 in the illustrated arrangement has a driven sprocket 294 (FIG. 6) while the crankshaft 178 has a drive sprocket 296. The driven sprockets 294 have a diameter that is twice as a diameter of the drive sprocket 296. A timing chain or belt 298 is wound around the respective sprockets 294, 296. The crankshaft 178 therefore drives the respective camshafts 268, 270. A rotational speed of the camshafts 268, 270 is half of the rotational speed of the crankshaft 178 because of the difference in the diameters of the respective sprockets 294, 296. That is, the engine 54 completes one cycle comprising the intake stroke, compression stroke, power stroke and exhaust stroke during two rotations of the crankshaft 178 and, thus, the valves are opened and closed once during the two cycles of the piston.

The engine 54 further includes an ignition or firing system that ignites the air/fuel charges in the combustion chambers 174 during every power stroke. Each combustion chamber 174 is provided with a spark plug 300 (see FIG. 6) which has an electrode 302 (see FIG. 7) exposed into the associated combustion chamber 174. The ignition system makes a spark at each electrode 302 at an appropriate ignition timing under control of an ignition control device so that the air/fuel charge is properly ignited. The air/fuel charge burns and abruptly expands in a manner that pushes the pistons 172 downward. The movement of the pistons 172 rotates the crankshaft 178. The burnt charges or exhaust gases are then discharged through the exhaust system 248, which has been described above.

With reference again to FIG. 3, the engine 54 preferably has with balancers 306, 308 disposed within the crankcase chamber 176 to balance the synchronous movement of the pistons and to provide smooth rotation of the crankshaft 178. The balancer 306 is journaled by the lower crankcase member 148 and is placed forwardly of the crankshaft 178, while the balancer 308 is journaled by the upper crankcase member 146 and is placed rearwardly of the crankshaft 178. The respective balancers 306, 308 are driven through gear configurations. In the illustrated arrangement, the crankshaft 178 has a gear 310 next to the left side wall 192 of the crankcase members 146, 148. The balancers 306, 308 mesh with the gear 310 so that the crankshaft 178 rotates both the balancers 306, 308. Preferably, the gear ratio is one-to-one to provide synchronous movement of the balancers and the crankshaft.

With reference again to FIG. 6, the engine 54 further comprises a flywheel magneto assembly 314 positioned at a location beyond the bearing member 214. The flywheel magneto assembly 314 preferably is housed in its own chamber and includes a rotor 316 that has a shaft 318 journaled for rotation by the bearing member 214. A housing member 320 is affixed to the crankcase members 146, 148 so as to enclose the flywheel magneto assembly 314 therein. A joint 322 couples the shaft 318 with the right side end 204 of the crankshaft 178 adjacent to the bearing member 214. The crankshaft 178 thus rotates the shaft 318 of the rotor 316 through the joint 322. The rotor 316 is configured in a generally cup-shape and a plurality of permanent magnets is affixed to an inner surface that defines the cup-shape. The flywheel magneto assembly 314 also includes a plurality of stator coils preferably affixed to a support member extending from an inner surface of the housing member 320 toward the rotor 316. The arrangement allows the magnets to intermittently pass the coils. The flywheel magneto assembly 314 thus generates AC power when the magnets in the rotor 316 rotate relative to the stator coils. Preferably, a rectifier-regulator circuit converts the AC power to DC power and a battery accumulates the DC power for usage of electrical devices of the snowmobile 30.

The rotor 316 preferably is made of metal and has sufficient weight to act as a flywheel. Because the rotor shaft 318 is separately formed from the crankshaft 178 and is coupled with the crankshaft 178 by the joint 322, the crankshaft 178 length is advantageously shortened. This is advantageous because production of the crankshafts becomes easier.

The engine 54 also has a starter mechanism 326 that can start the engine 54. The starter mechanism 326 preferably includes a starter gear 328 formed around the rotor shaft 318 and a starter motor which has a motor gear that meshes with the starter gear 328. A main switch activates the starter motor. When the rider 45 turns on the main switch before the engine 54 has started, the starter motor rotates and the rotor shaft 318 is driven by the starter motor through the combination of the motor gear and the starter gear 328. The rotor shaft 318 then rotates the crankshaft 178 through the joint 322 and the engine 54 thus is started.

In the illustrated embodiment, the starter mechanism 326 also includes a manual starter assembly 330 disposed outside of the housing 320 and at the outer end of the rotor shaft 318. The manual starter assembly 330 preferably is a recoil starter and includes a coiled rope with a handle affixed to an outer end of the rope. By pulling the rope with the handle, the crankshaft 178 is rotated and the engine 54 can be started. The foregoing decompression mechanism 288 can assists this manual start. The rider 45 therefore can selectively use the electrical starter assembly, which comprises the starter gear 328 and the starter motor, or the manual starter assembly 330 for starting the engine 54.

As described above, the snowmobile 30 is provided with the transmission 56, which defines the other section of the prime mover assembly 52, to transmit the output of the engine 54 to the drive assembly 58. With reference to FIG. 3, the transmission 56 includes an automatic transmission mechanism 334, a reduction gear combination mechanism 336 and a transmission shaft 338.

With reference to FIGS. 4 and 6, the automatic transmission mechanism 334 preferably is generally disposed along the left side of the snowmobile 30. The automatic transmission mechanism 334 includes a drive pulley 342 affixed to the left side end 202 of the crankshaft 178, a driven pulley 344 affixed to the left side end of the transmission shaft 338 and a transmission belt 346 wound around both the pulleys 342, 344. The transmission belt 346 conveys the output power of the engine 54 to the transmission shaft 338.

The drive pulley 342 includes a fixed member 346 and a moveable member 348, which have conical shapes. The moveable member 348 can move along the axis 180 of the crankshaft 178 and the separation between the fixed member 346 and the moveable member 348 can vary by centrifugal force. The belt 346 thus is positioned in a valley formed between the respective members 346, 348, which have conical shapes. When the engine speed increases, the effective diameter of the drive pulley 342 of the belt 346 increases because the moveable member 348 moves to the right. Of course, the driven pulley size also can be varied.

As seen in FIGS. 2 and 4, the reduction gear combination mechanism 336 is generally disposed on the right hand side of the snowmobile 30. This mechanism 336 includes a gear train that has at least a relatively small diameter gear affixed to the transmission shaft 338 and a relatively large diameter gear affixed to the driveshaft 60. The gears mesh either directly or via other one or more other gears. The driveshaft 60 therefore rotates in a fixed reduced speed relative to the rotation of the transmission shaft 338.

When the engine 54 operates under a normal running condition, the output of the engine 54 is transmitted to the transmission shaft 338 from the crankshaft 178 through the automatic transmission mechanism 334. The transmission shaft 338 rotates at a speed that is defined with the variable reduction ratio relative to the crankshaft 178 by the automatic transmission mechanism 334. The transmission shaft 338 then rotates the driveshaft 60 in a speed that is defined with the fixed reduction ratio relative to the transmission shaft 338 by the reduction gear combination mechanism 336. The driveshaft 60, in turn, drives the endless drive belt 76 through the drive sprocket 96. Accordingly, the drive belt 76 rotates and the snowmobile 30 can move.

With reference to FIGS. 3–6, a lubrication system 352 is provided within the engine 54. The lubrication system 352 is provided for lubricating engine portions such as bearings 186, 188, 190 and pistons 172 that need lubrication for avoid seizure. In the illustrated arrangement, the lubrication system 352 employs a dry-sump configuration. This type of lubrication system 352 primarily includes a lubricant oil reservoir 354, a delivery oil pump 357 and, in some arrangements, an oil return pump 358.

Figure 5:
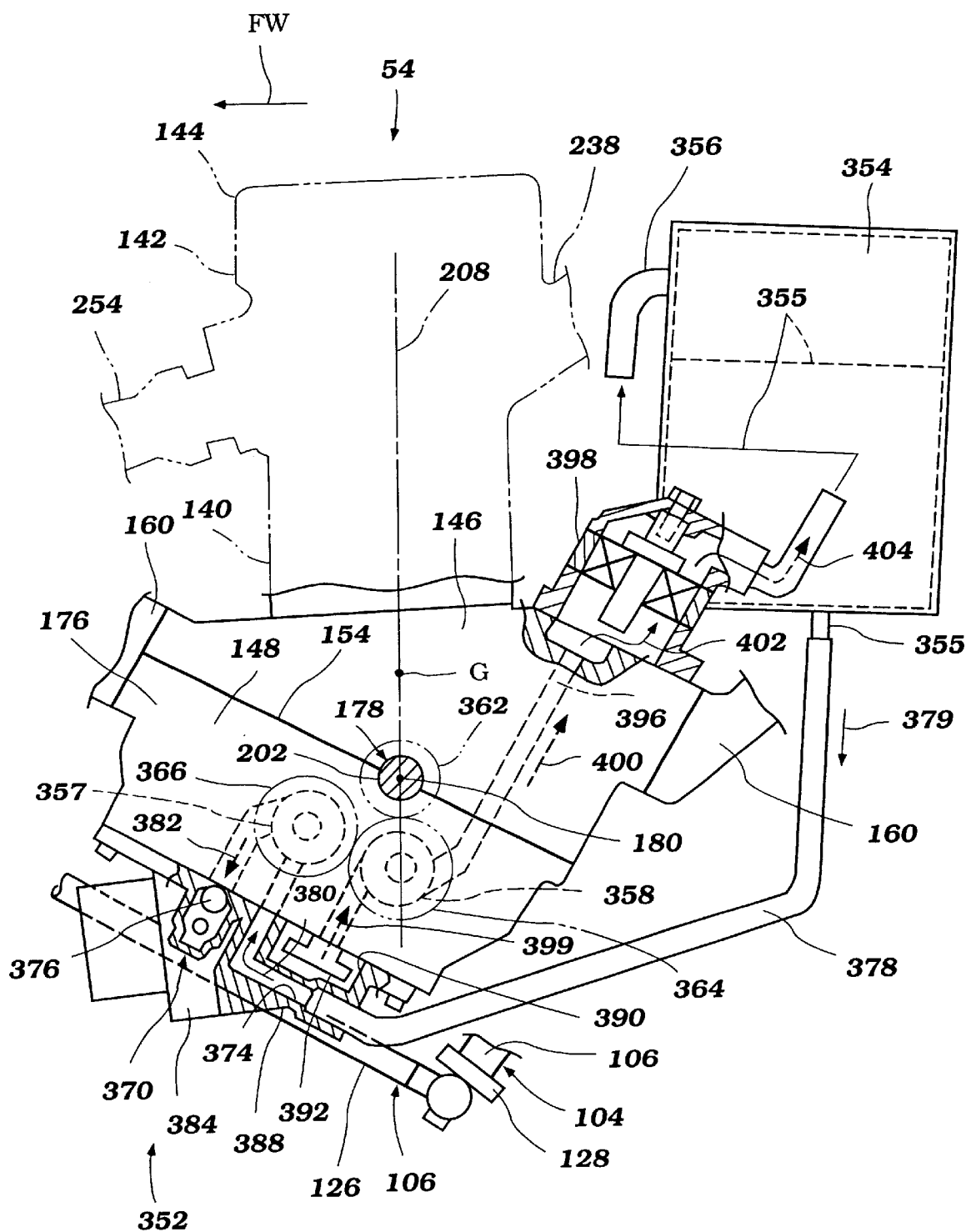
FIG. 5 is another enlarged side elevation view, primarily showing a lubrication system of the engine.

With reference to FIGS. 2 and 5, the oil reservoir 354 can be disposed generally behind the engine 54 and can be mounted on the frame assembly 32. More specifically, in the illustrated arrangement, the oil reservoir 354 is positioned behind the cylinder block 140 and higher than the flywheel magneto assembly 314. The location of the oil reservoir 354 is generally opposite to the drive pulley 342 of the automatic transmission mechanism 334 relative to the vertical plane 206. The illustrated oil reservoir 354 has a supply outlet port 355 at a bottom portion thereof and a return inlet port 356 at a side portion thereof. The oil reservoir 354 preferably contains a preset level of lubricant oil. This level is generally kept substantially constant by oil that returns to the reservoir 354 after lubricating the engine portions. The oil is returned through an oil circulation mechanism that works with the delivery and return pumps 357, 358 in the illustrated arrangement. Of course, the oil can be returned under the forces of gravity in some arrangements.

The delivery pump 357 and the return pump 358 in the illustrated arrangement are generally disposed in a space defined between the right side portion 196 of the crankcase members 146, 148 and the bearing member 214. That is, the pumps 357, 358 are positioned lower than the oil reservoir 354. Any type of pumps, for example, a trotted-type and a displacement-type, can be applied as the oil pumps 357, 358.

With reference to FIG. 5, in the illustrated arrangement, the crankshaft 178, the return pump 358 and the delivery pump 357 have gears 362, 364, 366, respectively. The gear 362 of the crankshaft 178 meshes with the gear 364 of the return pump 358 and this gear 364 meshes with the gear 366 of the delivery pump 357. Such a gear train or gear combination is only exemplary and can be of course changeable to any suitable arrangements. In addition, the pumps can be electrically driven, driven by chain or belt or any other suitable drive mechanism.

Preferably, an oil pan 370 depends from the lower crankcase chamber 148 so that the oil that has lubricated the engine portions temporally accumulates therein. The oil pan 370 communicates with the crankcase chamber 176 through a plurality of oil return passageways 372 (see FIG. 6). The oil pan 370 also comprises an inner oil supply passage 374 (see FIG. 5) and an oil delivery passage 376, at least in part. Both of the passages 374, 376 communicate with the oil delivery pump 357. An external oil supply conduit 378 couples the oil supply outlet port 355 with the inner oil supply passage 374. The oil delivery pump 357 takes the oil in through the oil supply passages 378, 374 and moves the oil through the oil delivery passage 376 as indicated with the arrows 379, 380, 382 of FIG. 5. The pressurized oil is delivered to, for example, the bearings 186, 188, 190 and further to other engine portions. An oil filter assembly 384 (see FIG. 5) preferably is provided for removing alien substances in the oil.

As noted above, the oil that has lubricated the engine portions returns to the oil pan 370 through the oil return passageways 372. The illustrated oil pan 370 preferably has a bulge portion 388 that defines a temporary oil chamber 390 wherein the returned oil temporarily accumulates. With reference to FIG. 6, the bulge portion 388 advantageously is formed at the bottom area of the lower crankcase member 148 so as to be positioned generally at the center thereof along the axis 180 of the crankshaft 178. In other words, the bulge portion 388 is positioned adjacent to the vertical plane 206 along the crankshaft axis 180. An oil strainer 392 depends from the bottom surface of the lower crankcase member 148 into the temporary oil chamber 390 and a portion of the oil passes through the oil strainer 392. The oil strainer 392 removed foreign substances from the returned oil to reduce the amount of foreign particulate matter that passes along the circulation system beyond the strainer 392. It should be noted that the bulge portion 388 preferably is closely sized and configured to accommodate the strainer 392 such that the protrusion of the bulge portion 388 into the clearance area below the engine can be reduced.

The oil return pump 358 is positioned along the oil return passage 396 which connects the temporary oil chamber 390 with the oil reservoir 354. More specifically, the oil return passage 396 preferably is defined between an inlet opening or suction port of the strainer 392 and the return inlet port 356 of the oil reservoir 354. In the illustrated arrangement, an oil cooler 398 is interposed between the oil return pump 358 and the oil reservoir 354 in the oil return passage 396. The oil cooler 398 cools the oil before returning to the oil reservoir 354 because the oil that has lubricated the engine portions accumulates much heat and its viscosity therefore is lowered. The oil cooler 398 restores at least a portion of the lost viscosity and somewhat reconditions the oil. The oil return pump 358 collects the oil in the oil chamber 390 through the oil strainer 392 as indicated by the arrow 399 of FIGS. 5 and 6 and moves it through the oil return passage 396 up to the oil reservoir 354 as indicated by arrows 400, 402, 404 of FIG. 5 on the way to the reservoir 354, the oil cooler 398 removes the heat accumulated in the oil.

When the engine 54 operates, the crankshaft 178 drives the oil delivery pump 357 and the oil return pump 358 through the gear train. The oil in the oil reservoir 354 pulled into the delivery pump 357 through the external oil supply passage 378 and the inner oil supply passage 374. The oil then is pressurized by the delivery pump 357 and is delivered to the engine portions including the bearings 186, 188, 190 through the oil delivery passages 376. After lubricating the engine portions, the oil drops down to the crankcase chamber 176 and gathers in the oil chamber 390 through the return passageways 372. Then the oil is pumped up by the oil return pump 358 through the oil strainer 392 and returns to the oil reservoir 354 through the oil cooler 398 due to pressurized by the return pump 358.

Preferably, the return pump 358 has a size larger than the delivery pump 357. This is advantageous because the oil in the oil chamber 390 can be more quickly returned to the oil reservoir 354 and the oil does not overflow the chamber 390. The size of the oil pan 370 therefore can be reduced.

With reference to FIG. 6, in the illustrated arrangement the foregoing housing member 320 has a lower portion or second bulge portion 406 projecting downward and its bottom surface is positioned slightly higher than the bottom surface of the bulge portion 388. A space 408 is defined between the lower portion of the housing member 320 and the bulge portion 388 of the oil pan 370.

As noted above, the bulge portion 388 is formed at the bottom area of the lower crankcase member 148 so as to be positioned generally at the center thereof along the axis 180 of the crankshaft 178. This construction is advantageous because all of the oil, which drops downward under gravity, can travel to the oil chamber 176 over generally equal distances from all locations within the crankcase. Accordingly, oil is less likely to pool or stand and most all of the oil returns to the oil chamber 176 over time.

It is anticipated that the lubrication system 352 can employ a wet-sump method instead of the dry-sump method. In this method, the engine 54 needs no oil reservoir but requires an oil pan that is relatively larger one because the oil for circulation is stored in this 30 oil pan. Whether the lubrication system 352 employs the dry-sump method or the wet-sump method, a relatively voluminous pan generally is formed under the crankcase chamber 176. As described above, the snowmobile 30 has a linkage assembly 106 that includes the relay rod 126 coupling the combination of the handle post 108 and the pitman arm 128 located to the rear of the engine 54 with the combination of the tie rods 122 and the center arm 124 located forward of the engine 54. The relay rod 126 thus must pass through the engine area and can result in the oil pan 370 being improperly formed.

In the illustrated arrangement, the relay rod 126 and the oil pan 370 are generally horizontally juxtaposed with each other. In other words, the relay rod 126 extends through a region that includes the oil pan 370 at approximately the same vertical height as a portion of the oil pan 370 without extending through the oil pan 370. With reference to FIG. 6, the relay rod 126 preferably is positioned next to the bulge portion 388 which projects downward from the oil pan 370. That is, the relay rod 126 extends in the space 408 that is defined between the lower portion of the housing member 320 and the bulge portion 388 of the oil pan 370. Preferably, a mid portion of the relay rod 126 is generally positioned higher than a bottom surface 410 of the bulge portion 388 and is positioned generally at the same height as the bottom of the housing member 320. A higher position of the relay rod 126 than the housing member 320 is of course possible. In addition, positioning the relay rod below a portion of the housing member 320 but at least level with (or higher than) the lowest portion of the engine, which may or not be the bottom surface 410 of the bulge portion 388 of the oil pan 370.

Because of this arrangement, the relay rod 126 and the oil pan 370 can coexist without interfering with each other. In other words, the relay rod 126 can be spaced apart from the terrain S sufficiently and the engine 54 can be provided with the oil pan 370 that has a sufficient capacity.

The arrangement also has additional advantages. One of these additional advantages is that the bulge portion 388 can offer some degree of protection for the recessed relay rod 126. For instance, in the event that the bottom plate 40 of the snowmobile 30 is deformed toward the relay rod 126 due to a collision with an obstruction in the terrain S, the deformed bottom plate 40 could ultimately contact and harm the rod 126. In general, a rod member can be most easily damaged at its mid portion when external force is exerted thereon. Because the bottom surface 410 of the bulge portion 370 is generally positioned lower than the mid portion of the relay rod 126 in the illustrated arrangement, a deformed plate 40 would not likely contact the raid portion of the rod 126. Thus, even if the plate were bent or otherwise distorted, the relay rod 126 would be substantially shielded from harm.

Moreover, in the illustrated arrangement, as described above, the location of the oil reservoir 354 is generally opposite to the drive pulley 342 of the automatic transmission mechanism 334 relative to the vertical plane 206. This arrangement is useful for substantially equal allotment of the component weight to both sides of the snowmobile 30.

Although the present invention has been described in terms of a certain preferred embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A snowmobile comprising a frame assembly, a drive assembly depending from the frame assembly and adapted to abut on the terrain so as to propel the snowmobile along the terrain, an internal combustion engine carried by the frame assembly so as to power the drive assembly, the engine including an oil pan in which lubricant oil accumulates, the oil pan being positioned generally at a bottom end of the engine, a steering ski depending from the frame assembly for steering movement, and a steering linkage extending through the frame assembly and arranged to steer the ski, the steering linkage and the oil pan, at least in part, being generally horizontally juxtaposed with each other.

2. The snowmobile as set forth in claim 1, wherein the steering ski has a top end positioned generally lower than the engine and generally in a forward area of the engine, the steering linkage includes a first linkage member extending generally vertically, the first linkage member has a bottom end positioned generally lower than the engine and in a rear area of the engine, and a second linkage member extends generally under the engine so as to couple the bottom of the first steering linkage with the top end of the steering ski.

3. The snowmobile as set forth in claim 2, wherein the steering ski includes a pair of ski members, and the steering linkage additionally includes a pair of third linkage members arranged to couple the second linkage member with the ski members.

4. The snowmobile as set forth in claim 2, wherein the oil pan has a bulge portion expanding from a bottom of the oil pan, and the second linkage member is positioned next to the bulge portion.

5. The snowmobile as set forth in claim 4, wherein the engine additionally including an oil pump and a suction port communicating to the oil pump, wherein the suction port is disposed within the bulge portion.

6. The snowmobile as set forth in claim 4, wherein the second linkage member, at least in part, is positioned higher than a bottom of the bulge portion.

7. The snowmobile as set forth in claim 1, wherein the engine additionally includes an oil pump and a suction port communicating to the oil pump, the oil pan has a bulge portion expanding from a bottom of the oil pan, the suction port is disposed within the bulge portion, and the second linkage member is positioned next to the bulge portion.

8. The snowmobile as set forth in claim 7, wherein the engine further includes a crankcase in which a crankshaft is journaled for rotation, the oil pan is defined generally at a bottom area of the crankcase, and the bulge portion is positioned generally at the center of the crankcase along the rotational axis of the crankshaft.

9. The snowmobile as set forth in claim 8, wherein the engine further includes a housing in which an engine related component is disposed, the housing is formed at one end of the crankcase so that the engine related component is driven by the crankshaft, the housing has a second bulge portion expanding from a bottom of the housing, and the steering linkage extends through a space defined between the first and second bulge portions.

10. The snowmobile as set forth in claim 7, wherein the bulge portion contains an oil strainer, and the oil strainer defines the suction port.

11. The snowmobile as set forth in claim 7, wherein the engine further includes an oil reservoir, and the oil pump returns the oil in the bulge portion to the oil reservoir through the suction port.

12. A land vehicle comprising a body frame, a drive unit depending from the body frame and adapted to abut on the terrain so as to propel the vehicle along the terrain, an internal combustion engine carried by the body frame so as to power the drive unit, the engine including an oil pan in which lubricant oil accumulates, the oil pan being positioned generally at a bottom of the engine and having a bulge portion expanding from a bottom of the oil pan, an oil pump, and a suction port communicating with the oil pump, the suction port being disposed within the bulge portion, and a steering assembly depending from the body frame for steering movement, the steering assembly including an abutting member adapted to abut on the terrain, and a steering linkage extending through the body frame and arranged to steer the abutting member, the steering linkage, at least in part, and the bulge portion of the oil pan being generally horizontally juxtaposed with each other.

13. The land vehicle as set forth in claim 12, wherein the abutting member has a top end positioned generally lower than the engine and generally in a forward area of the engine, the steering linkage includes a first linkage member extending generally vertically, the first linkage member has a bottom end positioned generally lower than the engine and in a rear area of the engine, and a second linkage member extending generally under the engine so as to couple the bottom end of the first linkage member with the top end of the abutting member.

14. The land vehicle as set forth in claim 13, wherein the second linkage member is positioned next to the bulge portion.

15. A vehicle comprising a frame assembly, at least one steerable member supporting said frame and contacting a surface over which the vehicle operates, a control mast positioned rearward of said at least one steerable member, a linkage extending between said control mast and said at least one steerable member, said linkage comprising a rotating link and a translating link, said rotating link extending between said control mast and said translating link, said translating link being inclined such that a forward portion is vertically higher from a horizontal reference plane than a rearward portion, an internal combustion engine mounted to said frame assembly and positioned between said at least one steerable member and said control mast, said engine comprising an oil pan having a lower surface and said translating link extending from said rotating link forward to a location forward of said oil pan and extending along a portion of said oil pan at a position above said lower surface.

16. A vehicle comprising a frame assembly, at least one steerable member supporting said frame and contacting a surface over which the vehicle operates, a control mast positioned rearward of said at least one steerable member, a linkage extending between said control mast and said at least one steerable member, said linkage comprising a rotating link and a translating link, said rotating link extending between said control mast and said translating link, a connection between said rotating link and said translating link being vertically lower than at least a portion of a connection between said translating link and said at least one steerable member, an internal combustion engine mounted to said frame assembly and positioned between said at least one steerable member and said control mast, said engine comprising an oil pan having a lower surface and said translating link extending from said rotating link forward to a location forward of said oil pan and extending along a portion of said oil pan at a position above said lower surface.

17. The vehicle of claim 16, wherein said connection between said rotating link and said translating link is vertically lower than said lower surface of said oil pan.

18. The vehicle of claim 16, wherein at least a portion of a connection between said translating link and said at least one steerable member is vertically higher than said lower surface of said oil pan.

19. The vehicle of claim 15, wherein said at least one steerable member is a ski.

20. The vehicle of claim 15, wherein said vehicle comprises a snowmobile that is driven with an endless belt that contacts the terrain.

21. A vehicle comprising a frame assembly, at least one steerable member supporting said frame and contacting a surface over which the vehicle operates, a control mast positioned rearward of said at least one steerable member, a linkage extending between said control mast and said at least one steerable member, said linkage comprising a rotating link and a translating link, said rotating link extending between said control mast and said translating link, an Internal combustion engine mounted to said frame assembly and positioned between said at least one steerable member and said control mast, said engine comprising an oil pan having a lower surface, the engine also comprising an auxiliary chamber being defined by a housing and being positioned to a side of said engine, a space being formed in a lower portion of said engine between at least a portion of said oil pan and at least a portion of said housing, said translating link extending in a longitudinal direction within said space.

22. The vehicle of claim 21, wherein said auxiliary chamber houses at least a flywheel.

23. The vehicle of claim 21, wherein said housing provides an air inlet into said auxiliary chamber.

24. The vehicle of claim 21, wherein a middle portion of said translating link is disposed within said space.

25. The vehicle of claim 21 further comprising a transmission that extends between a driving member of said vehicle and said engine, said transmission comprising a lower surface defined by a transmission case, said translating link being disposed at least partially vertically higher than said lower surface of said transmission.

26. The vehicle of claim 25, wherein said translating link is disposed completely vertically higher than said lower surface of said transmission.

27. The vehicle of claim 21, wherein said at least one steerable member is a ski.

28. The vehicle of claim 27, wherein said vehicle comprises a snowmobile that is driven with an endless belt that contacts the terrain.

* * * * *